US012664033B2

(12) United States Patent
Shinde

(10) Patent No.: US 12,664,033 B2
(45) Date of Patent: Jun. 23, 2026

(54) SYSTEMS AND METHODS FOR A SERVERLESS ORCHESTRATION LAYER

(71) Applicant: Capital One Services, LLC, McLean, VA (US)

(72) Inventor: Ajay Shinde, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 611 days.

(21) Appl. No.: 18/192,079

(22) Filed: Mar. 29, 2023

(65) Prior Publication Data

US 2023/0315548 A1 Oct. 5, 2023

Related U.S. Application Data

(60) Provisional application No. 63/362,168, filed on Mar. 30, 2022.

(51) Int. Cl.
*G06F 9/54* (2006.01)
*G06F 9/48* (2006.01)

(52) U.S. Cl.
CPC ............ *G06F 9/546* (2013.01); *G06F 9/4881* (2013.01)

(58) Field of Classification Search
None
See application file for complete search history.

(56) References Cited

U.S. PATENT DOCUMENTS

| | | | | |
|---|---|---|---|---|
| 9,824,130 B1 * | 11/2017 | Korshunov | ............. | G06F 16/27 |
| 2016/0275123 A1 * | 9/2016 | Lin | ........................ | G06F 9/5083 |
| 2017/0169336 A1 * | 6/2017 | Singhal | ............. | G06F 16/90335 |
| 2018/0293075 A1 * | 10/2018 | Liu | ........................ | G06F 9/5066 |
| 2019/0370065 A1 * | 12/2019 | Tao | ......................... | H04L 67/61 |
| 2021/0089358 A1 * | 3/2021 | Yeung-Rhee | ........... | G06F 21/64 |
| 2021/0334585 A1 * | 10/2021 | Szabo | ................. | G06F 18/2113 |
| 2022/0121880 A1 * | 4/2022 | Buniatyan | ........... | G06F 18/2148 |

FOREIGN PATENT DOCUMENTS

| | | | | | |
|---|---|---|---|---|---|
| WO | WO-2019032123 A1 * | 2/2019 | ............... | G06F 8/51 |
| WO | WO-2019144240 A1 * | 8/2019 | ............... | G06F 8/36 |

* cited by examiner

*Primary Examiner* — Charles E Anya

(74) *Attorney, Agent, or Firm* — Bookoff McAndrews, PLLC

(57) ABSTRACT

Systems and methods for implementing a server-less data management may include receiving a dataset comprising a plurality of partitions, scanning the dataset to identify a first partition and a second partition, generating a first kick-off job message associated with the first partition and a second kick-off job message associated with the second partition, sequencing the first kick-off job message before the second kick-off job message based on a sequencing model, generating a first job based on the first kick-off job message and a second job based on the second kick-off job message; and transmitting the first job before the second job based on sequencing the first kick-off job message before the second kick-off job message.

20 Claims, 5 Drawing Sheets

300

302 — RECEIVE A DATASET INCLUDING MULTIPLE PARTITIONS

304 — SCAN THE DATASET TO IDENTIFY A FIRST PARTITION AND A SECOND PARTITION

306 — GENERATE A FIRST KICK-OFF JOB MESSAGE ASSOCIATED WITH THE FIRST PARTITION AND A SECOND KICK-OFF JOB MESSAGE ASSOCIATED WITH THE SECOND PARTITION

308 — SEQUENCE THE FIRST KICK-OFF JOB MESSAGE BEFORE THE SECOND KICK-OFF JOB MESSAGE AND GENERATE A FIRST JOB AND A SECOND JOB BASED ON THE FIRST KICK-OFF JOB MESSAGE AND SECOND KICK-OFF JOB MESSAGE, RESPECTIVELY

310 — TRANSMIT THE FIRST JOB AND THE SECOND JOB

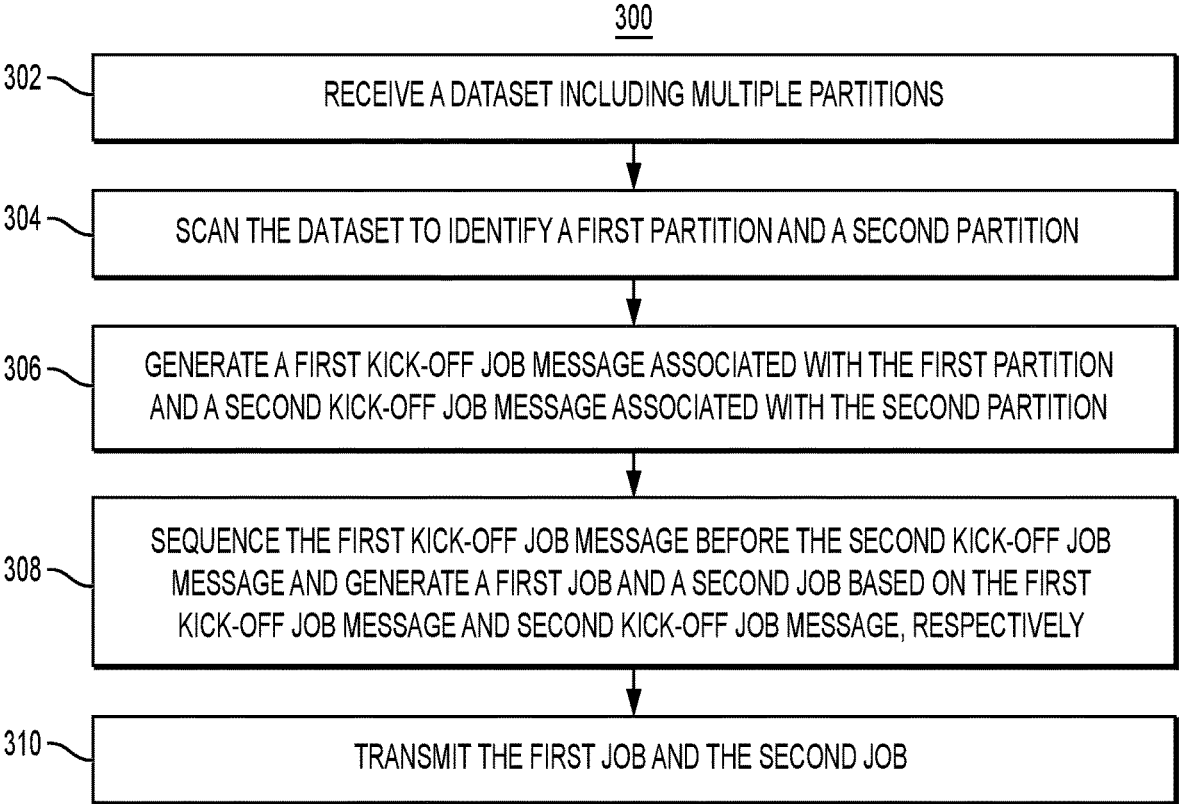

300

302 — RECEIVE A DATASET INCLUDING MULTIPLE PARTITIONS

304 — SCAN THE DATASET TO IDENTIFY A FIRST PARTITION AND A SECOND PARTITION

306 — GENERATE A FIRST KICK-OFF JOB MESSAGE ASSOCIATED WITH THE FIRST PARTITION AND A SECOND KICK-OFF JOB MESSAGE ASSOCIATED WITH THE SECOND PARTITION

308 — SEQUENCE THE FIRST KICK-OFF JOB MESSAGE BEFORE THE SECOND KICK-OFF JOB MESSAGE AND GENERATE A FIRST JOB AND A SECOND JOB BASED ON THE FIRST KICK-OFF JOB MESSAGE AND SECOND KICK-OFF JOB MESSAGE, RESPECTIVELY

310 — TRANSMIT THE FIRST JOB AND THE SECOND JOB

*FIG. 3*

SYSTEMS AND METHODS FOR A SERVERLESS ORCHESTRATION LAYER

CROSS-REFERENCE TO RELATED APPLICATION(S)

This application claims the benefit of U.S. Provisional Patent Application 63/362,168, filed Mar. 30, 2022, the entire contents of which are incorporated herein by reference.

TECHNICAL FIELD

Various embodiments of the present disclosure relate generally to a self-service orchestration layer, and more particularly, systems and methods for implementing a server-less orchestration layer for data management.

BACKGROUND

Organizations often generate, store, receive, and/or manage large amounts of data across multiple databases. Generally, such data is often updated, can be stored using various file storage formats, has varying size requirements, and undergoes schema changes. Datasets often have to be read in various formats and may be retained and/or processed in similar formats.

The present disclosure is directed to addressing one or more of the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for implementing a server-less orchestration layer for data management.

According to an aspect, a method for server-less data management includes: receiving a dataset comprising a plurality of partitions; scanning the dataset to identify a first partition and a second partition; generating a first kick-off job message associated with the first partition and a second kick-off job message associated with the second partition; sequencing the first kick-off job message before the second kick-off job message based on a sequencing model; generating a first job based on the first kick-off job message and a second job based on the second kick-off job message; and transmitting the first job before the second job based on sequencing the first kick-off job message before the second kick-off job message.

According to another aspect, as system includes: an orchestration lambda; a simple queue service (SQS) queue; a job submitter lambda; an orchestration Elastic Map Reduce (EMR); and one or more processors configured to: receive a dataset comprising a plurality of partitions at the orchestration lambda; generate a dataset kick-off job at the orchestration lambda; receive the dataset kick-off job at the SQS queue; receive the dataset kick-off job at the job submitter lambda; receive the dataset kick-off job at the orchestration EMR; segregate the dataset into a first partition and a second partition at the orchestration EMR, based on the dataset kick-off job; generate a first kick-off job message associated with the first partition and a second kick-off job message associated with the second partition, at the orchestration EMR; receive the first kick-off job message and the second kick-off job message at the SQS queue; sequence the first kick-off job message before the second kick-off job message based on a sequencing model, by the SQS queue; receive the first kick-off job message before the second kick-off job message at the job submitter lambda; generate a first job based on the first kick-off job message and a second job based on the second kick-off job message, at the job submitter lambda; and transmit, by the job submitter lambda, the first job before the second job based on sequencing the first kick-off job message before the second kick-off job message.

According to another aspect, a system includes: a data storage device storing processor-readable instructions; and a processor operatively connected to the data storage device and configured to execute the instructions to perform operations that include: receiving a dataset comprising a plurality of partitions; scanning the dataset to identify a first partition and a second partition; generating a first kick-off job message associated with the first partition and a second kick-off job message associated with the second partition; sequencing the first kick-off job message before the second kick-off job message based on a sequencing model; generating a first job based on the first kick-off job message and a second job based on the second kick-off job message; and transmitting the first job before the second job based on sequencing the first kick-off job message before the second kick-off job message.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3 depicts a flow chart for implementation an orchestration layer, according to one or more embodiments.

DETAILED DESCRIPTION OF EMBODIMENTS

Figure 1:
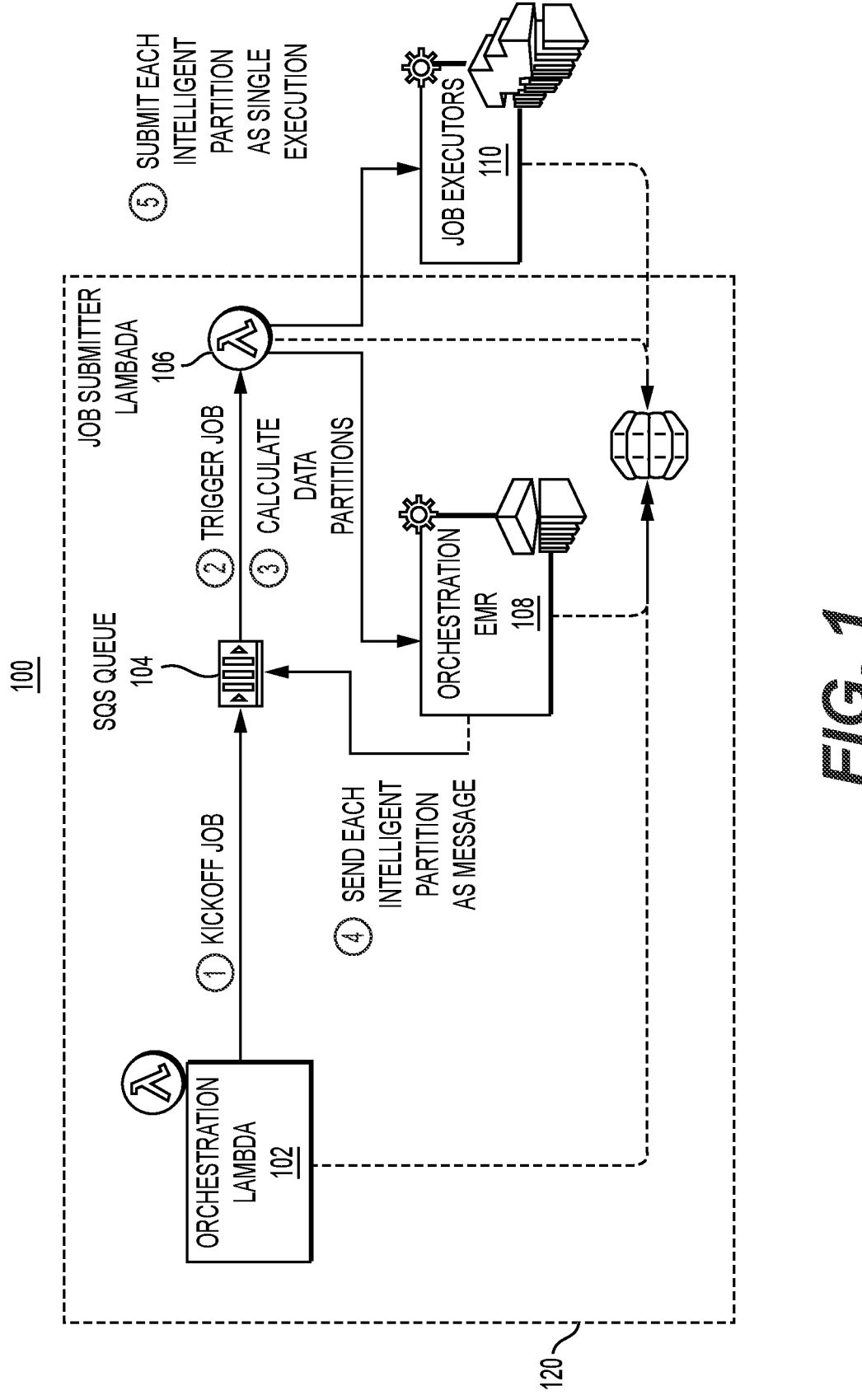
FIG. 1 depicts an exemplary environment for a job orchestrator, according to one or more embodiments.

According to certain aspects of the disclosure, methods and systems are disclosed for implementing a server-less orchestration layer. As disclosed herein, a self-service server-less orchestration layer may be implemented to manage Elastic Map Reduce (EMR) execution. As discussed herein, a server-less layer may be implemented as a cloud computing execution model in which a cloud provider may allocate machine resources on demand, to service servers (e.g., on behalf of an entity). The orchestration layer may include a server-less lambda, a simple queue service (SQS), and/or EMR components to optimize data management performance. The server-less orchestration layer may be used to increase fault tolerance and large-size dataset processing.

An EMR may be used as a platform for running large scale distributed data processing jobs. Larger historical data processing may experience challenges related to creating big clusters as well as data related issues (e.g., schema drifts, data privacy concerns, etc.). Such clusters may be resource and/or cost intensive.

Techniques disclosed herein facilitate keeping data intact. A server-less orchestration layer disclosed herein provides seamless large data processing (e.g., for data privacy implementation, for historical data, etc.). Using a lambda, SQS, and EMR concurrently, overall data performance may be improved.

According to implementations of the disclosed subject matter, a given dataset (e.g., a historical dataset) may include multiple partitions (e.g., iterations). Such multiple partitions may be, for example, generated over multiple time periods (e.g., a first partition may include data from a first day, and a second partition may include data from a second day). There may be file name discrepancies and/or schema drifts across the multiple partitions of a dataset. A schema shift may be where a first schema for a first partition is different than a second schema second partition. As a simplified example, a given partition may include a given number of columns in a table. A subsequent partition may add one or more columns, resulting in a schema drift between the two partitions. A traditional EMR may not be configured to receive a dataset having multiple schemas or discrepancy in file attributes.

According to techniques disclosed herein, a server-less orchestration layer may be used to generate multiple jobs for different partitions of a given dataset. The server-less orchestration layer may detect the different partitions of a given dataset. A job may be any applicable processing, analysis, storage, or use of data. The orchestration layer may output a job for each given partition having a given schema, such that a dataset may be provided to an EMR based on a plurality of jobs, each job associated with a partition of the dataset. As further disclosed herein, the orchestration layer may generate an infrastructure for each dataset, and may trigger individual jobs for each schema. Accordingly, the server-less orchestration layer may allow use of an EMR by segregating jobs based on partitions to avoid discrepancies in data (e.g., file names, content, etc.) or schema drifts that may present across multiple partitions of a dataset.

Traditionally, server-less orchestration solutions are not available for historical data & data privacy processing. As an example, Airflow™ is an orchestration platform for managing pipelines which enables Spark™ job schedules and monitor jobs. However, Airflow™ only offers orchestration at a job level and does not help to solve data challenges and optimize job execution. Traditional datasets may include hierarchy of datasets (e.g., by name, partition key, multiple files, etc.). Rather than managing jobs at a dataset level, the server-less orchestration layer disclosed herein uses a lambda, SQS, and EMR concurrently to achieve optimized performance by managing and scaling data at a granular level. For example, such a server-less orchestration layer may use a lambda, SQS, and/or EMR concurrency, which may allow management of job execution (e.g., Spark™ jobs) at partition levels and/or file levels.

As used herein, an EMR may be a cloud big data platform for running large-scale distributed data processing jobs, interactive Structured Query Language (SQL) queries, and/or machine learning (ML) applications using analytics frameworks (e.g., open source frameworks such as Apache Spark™, Apache Hive™, and Presto™). An EMR may run large-scale data processing and what-if analysis using statistical algorithms and/or predictive models to uncover hidden patterns, correlations, market trends, and/or customer preferences. An EMR may extract data from a variety of sources, process the data at scale, and/or make such data available for applications and users. An EMR may analyze events from streaming data sources in real-time to create long-running, highly available, and fault-tolerant streaming data pipelines. An EMR may analyze data using open-source ML frameworks such as Apache Spark MLlib, TensorFlow, and Apache MXNet. Connect to Amazon SageMaker Studio, etc., for large-scale model training, analysis, and reporting.

As used herein, an SQS may be a fully managed message queuing service that facilitates decoupling and scaling of micro services, distributed systems, and/or server-less applications. An SQS may reduce or eliminate the complexity and overhead associated with managing and/or operating message-oriented middleware, and may empower developers to focus on differentiating work. An SQS may be used to send, store, and/or receive messages between software components at any volume, without losing messages or requiring other services to be available. An SQS may be implemented using a software development kit (SDK) and/or application programing interfaces (APIs).

An SQS may be implemented using any suitable type of message queue. Standard queues may offer maximum throughput, best-effort ordering, and at-least-once delivery. SQS first in first out (FIFO) queues may be used such that messages are processed exactly once, in the exact sequence that they are sent.

A server-less orchestration layer disclosed herein may include an orchestration lambda component. The orchestration lambda component may be a reactive component configured to detect lambda triggers to initiate a data management process. The orchestration lambda component may initiate and/or terminate infrastructure required for an orchestration operation. An orchestration lambda component may be a server-less software component that is executed using one or more machines (e.g., local processing devices).

The server-less orchestration layer may include an SQS queue. The SQS queue may be used for storing processing elements of one or more datasets. Such elements may include dataset partitions.

The server-less orchestration layer may include a job submitter lambda. The job submitter lambda may distribute EMR execution jobs across multiple clusters.

The server-less orchestration layer may include an orchestration EMR. The orchestration EMR may be an intelligent lambda that detects schema drifts and/or breaks overall job execution into intelligent partitions. Server-less job orchestration, as disclosed herein, may allow operation (e.g., job execution) at a partition level, mitigating or preventing schema drift often experienced with job executions performed at a dataset level (e.g., schema changes between partition keys). For example, a traditional dataset level job execution may experience schema drift between a first partition key (e.g., dataset folder>>partition key (YYMMSS–schema1)>>part files) and a second partition key (e.g., dataset folder>>partition key (YYMMSS–schema2)>>part files). However, server-less job orchestration, as disclosed herein, may be used to generate unique jobs for each partition, preventing job orchestration across multiple schemas.

The server-less orchestration layer may include a data store. The data store may log job submissions statistics and/or their respective progress.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially," "approximately," and "generally," are used to indicate a possible variation of ±10% of a stated or understood value.

According to an implementation, privacy data management component may be implemented to identify impacted dataset participation and execution without changing data integrity. A self-service orchestration layer disclosed herein may scan a dataset for any schema drifts or data sizing. The layer may generate estimations based on the scan. An orchestration lambda may generate one or more EMR clusters to calculate partitions intelligently.

The one or more EMR clusters and/or calculated partitions may be published on the SQS queue. A job submitted lambda may submit the data partitions on the EMR (e.g., for cleaning or redacting privacy data). After processing the related data, the orchestration lambda layer may terminate at least a portion, e.g., all, of any activated infrastructure, resulting in reduced resource use and applicable cost saving.

FIG. 1 depicts an exemplary system 100 for implementing an orchestration layer 120. Orchestration layer 120 may be a server-layer (e.g., may be implemented using one or more local processing devices). Orchestration layer 120 may include an orchestration lambda 102, a SQS queue 104, a job submitter lambda 106, an orchestration EMR 108, and may output jobs for execution via job executor 110. Job executor 110 may be an EMR configured to execute jobs for a given dataset, or partitions thereof, as disclosed herein.

Orchestration lambda 102 may receive a dataset having multiple partitions (e.g., multiple partitions of the dataset with, for example, schema drifts). Orchestration lambda 102 may receive a dataset based on one or more triggers. For example, orchestration lambda 102 may be triggered based on a Simple Storage Service (S3) bucket file trigger using a Simple Notification Service (SNS). In accordance with this example, when a dataset is copied or received at the S3 bucket, the orchestration lambda 102 is triggered based on that dataset. Based on receiving the dataset, orchestration lambda 102 may generate one or more dataset level kick-off job messages. Orchestration lambda 102 may also initiate software and/or hardware components including one or more of SQS queue 104, job submitter lambda 106, and/or orchestration EMR 108, as shown in FIG. 1. For example, the initiations may be based on receiving the dataset.

SQS queue 104 may transmit the dataset level kick-off job message(s) to job submitter lambda 106. Job submitter lambda 106 may trigger orchestration EMR 108 and may provide the dataset and/or dataset level job message(s) to orchestration EMR 108. Alternatively, according to an implementation, orchestration EMR 108 may receive the dataset from a different component (e.g., orchestration lambda 102). Orchestration EMR 108 may segregate the dataset into individual partitions (e.g., based on identifiers identifying the partitions, based on processing the data in the dataset, or the like) based on the dataset level kick-off job message(s). For example, orchestration EMR 108 may parse the dataset based on identifiers associated with each partition.

As another example, orchestration EMR 108 may provide the dataset to a machine learning model. The machine learning model may be trained in accordance with techniques disclosed herein. The machine learning model may be trained based on historical datasets or simulated datasets. The machine learning model may include weighs, layers, nodes, and/or synapses configured to detect different partitions within a dataset (e.g., based on a threshold amount of difference between a given partition and one or more other partitions). The machine learning model may output the partitions or indications associated with the partitions included within the dataset.

Orchestration EMR 108 may generate kick-off job messages for each partition (e.g., intelligent iterations), and may provide the kick-off job messages to SQS queue 104. Accordingly, SQS queue 104 may receive, store, and/or execute a plurality of messages corresponding to the multiple partitions and/or respective kick-off job messages provided by orchestration EMR 108. It will be understood that rather than having a single message or set of messages based on an entire dataset, the techniques herein may separate messages or sets of messages based on partitions identified by orchestration EMR 108.

SQS queue 104 may transmit the kick-off job messages based on the partitions, to job submitter lambda 106. For example, the kick-off job messages may be ordered sequentially (e.g., based on dates associated with the partitions, based on an order of urgency, based on an order of importance, based on a different attribute, etc.). SQS queue 104 may determine the sequence of the kick-off job messages or may be provided the sequence of the kick-off job messages. For example, a machine learning model trained based on historical or simulated datasets and/or historical or simulated sequences may receive the partitions as an input to the machine learning model. The machine learning may be trained to output a sequence for the partitions. According to an implementation, a first machine learning model may output dataset partitions, as discussed herein, and may provide the output dataset partitions to a second machine learning model. The second machine learning model may be trained to output a sequence for the partitions based on the dataset partitions output by the first machine learning model.

Job submitter lambda 106 may generate jobs based on the kick-off job messages provided by SQS queue 104. The jobs generated based on the kick-off job messages may be formatted or may include content that may allow job executor 110 to perform each respective job. Accordingly, job submitter lambda 106 may generate jobs based on each partition identified by orchestration EMR 108. Job submitter lambda 106 may generate jobs in a sequence, based on the sequence output by SQS queue 104.

Job submitter lambda 106 may transmit jobs to job executor 110, which may be an EMR. Job executor 110 may receive the data associated with each job from job submitter lambda 106 or from one or more other components. Job executor 110 may execute each of the jobs associated with each partition separately. Accordingly, job executor 110 may process jobs for each partition, instead of for an overall dataset. Accordingly, job executor 110 may be able to process jobs without schema drift or discrepancies introduced in an overall dataset.

Figure 2:
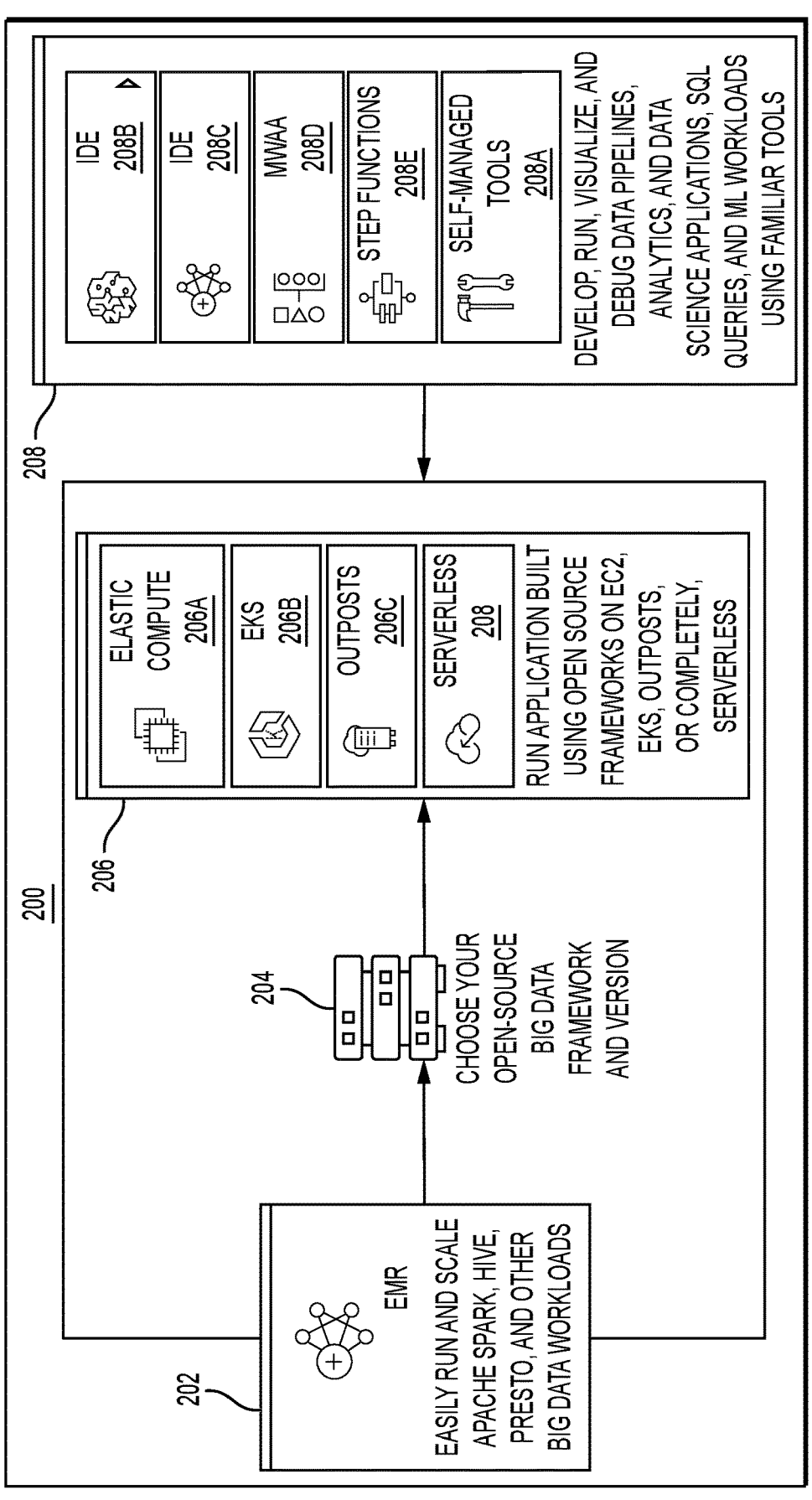
FIG. 2 depicts an example flow diagram of an exemplary method for implementation an orchestration layer, according to one or more embodiments.

FIG. 2 depicts an example flow diagram 200 of an exemplary method for implementing an orchestration layer 120 of FIG. 1. EMR 202 may correspond to job executor 110 of FIG. 1. EMR 202 may be configured based on a framework selection tool 204 that may allow selection of tools 206. Tools 206 may be used to implement or configure EMR 202.

Tools 206 may include an elastic compute component 206A which may be a cloud component that may be a web service that provides secure, resizable compute cloud capacity. Elastic compute component 206A may be designed to provide web-scale cloud computing and may include a web service interface that may allow EMR 202 to obtain and/or configure computing capacity. Tools 206 may include an elastic Kubernetes service (EKS 206B) that may be a managed Kubernetics service that execution of Kubernets on a cloud or on premise computing component. As applied herein, Kubernetes may include systems for automating deployment, scaling, and management of containerized applications.

Tools 206 may include outposts 206C. Outposts 206C may import one or more services, infrastructures, and/or operating models to a data center, co-location space, and/or on-premises facility.

Tools 206 may include server-less tools 208. Server-less tools 208 may include self-managed tools 208A. The serverless orchestration layer (e.g., orchestration layer 120 of FIG. 1) may be part of server-less tools 208 and may be used to provide jobs to EMR 202.

Server-less tools 208 may include a web-based, integrated development environment (IDE) 208B for machine learning. IDE 208B may facilitate building, training, debugging, deploying, and/or monitoring of the machine learning models disclosed herein.

Server-less tools 208 may include an integrated development environment (IDE) 208C for development, visualization, and debugging of applications (e.g., engineering applications, data science applications, etc.) written in a programing language (e.g., R, Python, Scala, PySpark, etc.).

Server-less tools 208 may include a managed workflow for Apache Airflow (MWAA) 208D which may be a managed service for Apache Airflow that for orchestrating workflows. MWAA 208D may provide improved scalability, availability, and security without an operational burden of managing underlying infrastructures.

Server-less tools 208 may include step functions 208E. Step functions 208E may include a visual workflow service for building distributed applications, building automated processes, orchestrating of micro services, and/or creating data and/or machine learning pipelines.

FIG. 3 depicts a flow chart 300 for implementation an orchestration layer in accordance with the techniques disclosed herein. At 302, a dataset including multiple partitions may be received. The dataset including the multiple partitions may be received at orchestration lambda 102, as shown in FIG. 1. Orchestration lambda 102 may generate a dataset kick-off job message based on receiving the dataset. The dataset kick-off job message may be based on the dataset (e.g., may be one or more dataset level job messages). Orchestration lambda 102 may also initiate software and/or hardware components including one or more of SQS queue 104, job submitter lambda 106, and/or orchestration EMR 108. For example, the initiations may be based on the dataset at the orchestration lambda 102.

At 304, the dataset may be scanned to identify multiple partitions including a first partition and a second partition. For example, as shown in FIG. 1, orchestration lambda 102 may transmit the dataset kick-off job message to SQS queue 104. SQS queue 104 may transmit the dataset kick-off job message to job submitter lambda 106. Job submitter lambda 106 may trigger orchestration EMR 108 and may provide the dataset and/or the dataset job message to orchestration EMR 108. Orchestration EMR 108 may segregate the dataset into individual partitions (e.g., based on identifiers identifying the partitions, based on processing the data in the dataset, or the like). For example, orchestration EMR 108 may parse the dataset based on identifiers associated with each partition or by using a machine learning model, as disclosed herein. EMR 108 and/or the machine learning model may detect a difference between two or more identifiers associated with two or more respective partitions. Based on a first identifier having a threshold amount of difference than a second identifier, a first partition associated with the first identifier may be identified as separate from a second partition associated with the second identifier.

At 306, a first kick-off job message associated with the first partition may be generated at orchestration EMR 108 or job submitter lambda 106, as further discussed herein. Similarly, a second kick-off job message associated with the second partition may be generated orchestration EMR 108 or job submitter lambda 106, as further discussed herein. The first kick-off job message and/or second kick-off job message may include a unique partition key and/or file name for execution at orchestration EMR 108. An example dataset job message may be:

dataset      folder>>partition     key     (YYMMSS–
       schema1)>>part files
    dataset      folder>>partition     key     (YYMMSS–
       schema2)>>part files A corresponding example first kick-off job message generated by orchestration EMR 108 or first job generated by job submitter lambda 106 may be:

{"JobConfiguration": <Job Config Details>,
    "FilePath": "dataset_folder/20220301<partition key>" }

A corresponding example second kick-off job message generated by orchestration EMR 108 or second job generated by job submitter lambda 106 may be:

{"JobConfiguration": <Job Config Details>,
    "FilePath": "dataset_folder/20220401<partition key>" }

For example, orchestration EMR 108 may generate the first kick-off job message and the second kick-off job message and may provide the same to SQS queue 104. SQS queue 104 may receive, store, and/or execute the first kick-off job message corresponding to the first partition and the second kick-off job message corresponding to the second partition.

At 308, the first kick-off job message and the second kick-off job message may be sequenced. For example, the first kick-off job message may be sequenced before the second kick-off job message. For example, SQS queue 104 may transmit the first kick-off job message and the second kick-off job message to job submitter lambda 106. The first kick-off job message and the second kick-off job message may be ordered sequentially (e.g., based on a timestamp associated with the partitions), based on an order of urgency, based on an order of importance, or based on a different attribute. SQS queue 104 may determine the sequence of messages or may be provided the sequence of messages (e.g., using a machine learning model, as disclosed herein). The first kick-off job message and the second kick-off job message may be provided to job submitter lambda 106, in sequence.

Job submitter lambda 106 may generate a first job and a second job based on the first kick-off job message and the second kick-off job. As provided in the example above, job submitter lambda 106 may modify a database level job message or kick-off job messages to generate the first job and second job. Accordingly, job submitter lambda 106 may generate jobs based on each partition identified by orchestration EMR 108. Job submitter lambda 106 may generate the first job and second job in a sequence (e.g., the first job may be generated prior to the second job), based on the sequence output by SQS queue 104.

At 310, the first job and the second job may be transmitted, in sequence. For example, job submitter lambda 106 may transmit the first job and the second job to job executor 110, in sequence. Job executor 110 may receive the data associated with the first job and the second job from job submitter lambda 106 or from one or more other components. Job executor 110 may execute each of the first and second jobs associated with the first and second partition separately. Accordingly, job executor 110 may process jobs for each partition, instead of for the overall dataset received at step 302.

It should be understood that embodiments in this disclosure are exemplary only, and that other embodiments may include various combinations of features from other embodiments, as well as additional or fewer features.

Figure 4:
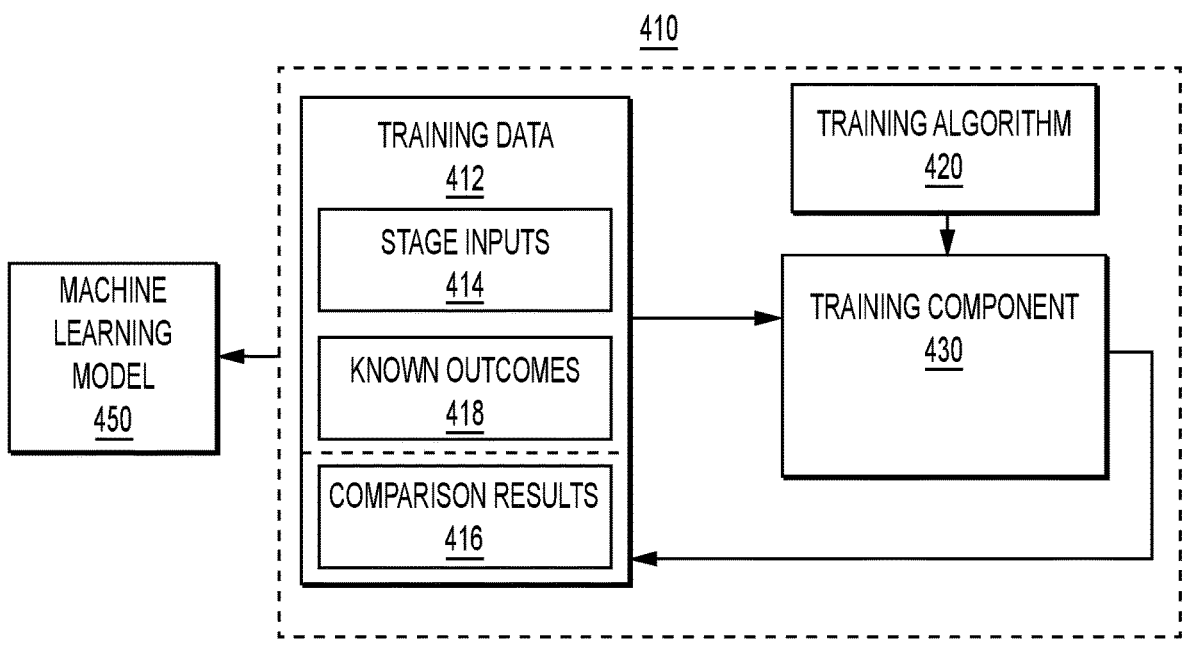
FIG. 4 depicts a flow diagram for training a machine learning model, according to one or more embodiments.

One or more implementations disclosed herein may be applied by using a machine learning model. A machine learning model as disclosed herein may be trained using the system 100 of FIG. 1, flow diagram 200 of FIG. 2, and/or flow chart 300 of FIG. 3. As shown in flow diagram 410 of FIG. 4, training data 412 may include one or more of stage inputs 414 and known outcomes 418 related to a machine learning model to be trained. The stage inputs 414 may be from any applicable source including a component or step shown in FIGS. 1-3. The known outcomes 418 may be included for machine learning models generated based on supervised or semi-supervised training. An unsupervised machine learning model might not be trained using known outcomes 418. Known outcomes 418 may include known or desired outputs for future inputs similar to or in the same category as stage inputs 414 that do not have corresponding known outputs.

The training data 412 and a training algorithm 420 may be provided to a training component 430 that may apply the training data 412 to the training algorithm 420 to generate a trained machine learning model 450. According to an implementation, the training component 430 may be provided comparison results 416 that compare a previous output of the corresponding machine learning model to apply the previous result to re-train the machine learning model. The comparison results 416 may be used by the training component 430 to update the corresponding machine learning model. The training algorithm 420 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like. The output of the flow diagram 410 may be a trained machine learning model 450.

In general, any process or operation discussed in this disclosure that is understood to be computer-implementable, such as the systems and processes illustrated in FIGS. 1-3, may be performed by one or more processors of a computer system, such as any of the systems or devices in the exemplary system 100 of FIG. 1 and/or flow diagram 200 of FIG. 2, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 1 or FIG. 2. One or more processors of a computer system may be included in a single computing device or distributed among a plurality of computing devices. A memory of the computer system may include the respective memory of each computing device of the plurality of computing devices.

Figure 5:
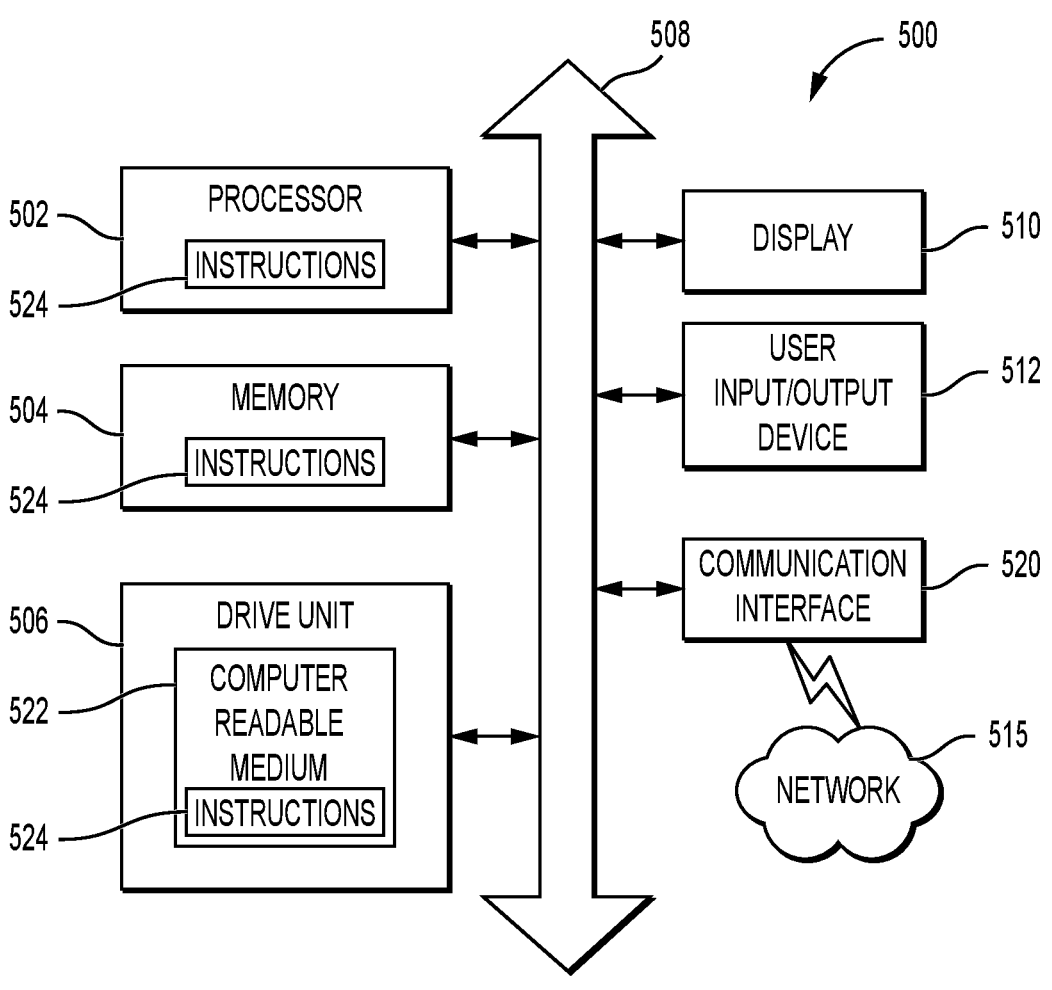
FIG. 5 depicts an example of a computing device, according to one or more embodiments.

FIG. 5 is a simplified functional block diagram of a computer 500 that may be configured as a device for executing the systems, devices, or steps of FIGS. 1-3, according to exemplary embodiments of the present disclosure. For example, the computer 500 may be configured as a system according to exemplary embodiments of this disclosure. In various embodiments, any of the systems herein may be a computer 500 including, for example, a data communication interface 520 for packet data communication. The computer 500 also may include a central processing unit ("CPU") 502, in the form of one or more processors, for executing program instructions. The computer 500 may include an internal communication bus 508, and a storage unit 506 (such as ROM, HDD, SDD, etc.) that may store data on a computer readable medium 522, although the computer 500 may receive programming and data via network communications 515. The computer 500 may also have a memory 504 (such as RAM) storing instructions 524 for executing techniques presented herein, although the instructions 524 may be stored temporarily or permanently within other modules of computer 500 (e.g., processor 502 and/or computer readable medium 522). The computer 500 also may include input and output ports 512 and/or a display 510 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A method for server-less data management, the method comprising:

receiving a dataset comprising a plurality of partitions;

providing the dataset as an input to a first machine learning model, wherein the first machine learning model is trained based on one of historical data sets or simulated datasets to identify one or more partitions from the plurality of partitions;

receiving, from the first machine learning model, a first output comprising a first partition and a second partition of the plurality of partitions identified based on the dataset;

generating a first kick-off job message associated with the first partition and a second kick-off job message associated with the second partition;

sequencing the first kick-off job message before the second kick-off job message based on a sequencing model;

generating a first job based on the first kick-off job message and a second job based on the second kick-off job message; and transmitting the first job before the second job based on sequencing the first kick-off job message before the second kick-off job message.

2. The method of claim 1, wherein the dataset is received at an orchestration lambda, the orchestration lambda being a part of an orchestration server-less layer.

3. The method of claim 2, further comprising initiating, by the orchestration lambda, one or more of a simple queue service (SQS) queue, a job submitter lambda, or an orchestration Elastic Map Reduce (EMR).

4. The method of claim 1, further comprising providing the first kick-off job message and the second kick-off job message to a simple queue service (SQS) queue.

5. The method of claim 1, wherein the sequencing model is configured to sequence the first kick-off job message before the second kick-off job message based on one or more of a timestamp, an urgency, or an order of importance.

6. The method of claim 1, wherein the sequencing model is a machine learning model.

7. The method of claim 6, wherein the machine learning model is trained based on one or more of historical kick-off messages, simulated kick-off messages, historical sequences, or simulated sequences.

8. The method of claim 1, wherein the sequencing model comprises a second machine learning model and wherein sequencing the first kick-off job message before the second kick-off job message comprises:

providing the first output to the second machine learning model, wherein the second machine learning model is trained based on one or more of historical kick-off messages, simulated kick-off messages, historical sequences, or simulated sequences; and receiving, from the second machine learning model, a second output comprising the first kick-off job message sequenced before the second kick-off job message.

9. The method of claim 1, wherein, to identify the first partition and the second partition, the first machine learning model is configured to detect a threshold difference between a first identifier associated with the first partition and a second identifier associated with the second partition.

10. A system comprising:

an orchestration lambda;

a simple queue service (SQS) queue;

a job submitter lambda;

an orchestration Elastic Map Reduce (EMR); and one or more processors configured to:

receive a dataset comprising a plurality of partitions at the orchestration lambda;

generate a dataset kick-off job at the orchestration lambda;

receive the dataset kick-off job at the SQS queue;

receive the dataset kick-off job at the job submitter lambda;

receive the dataset kick-off job at the orchestration EMR;

segregate the dataset into a first partition and a second partition at the orchestration EMR, based on the dataset kick-off job;

generate a first kick-off job message associated with the first partition and a second kick-off job message associated with the second partition, at the orchestration EMR;

receive the first kick-off job message and the second kick-off job message at the SQS queue;

sequence the first kick-off job message before the second kick-off job message based on a sequencing model, by the SQS queue;

receive the first kick-off job message before the second kick-off job message at the job submitter lambda;

generate a first job based on the first kick-off job message and a second job based on the second kick-off job message, at the job submitter lambda; and transmit, by the job submitter lambda, the first job before the second job based on sequencing the first kick-off job message before the second kick-off job message.

11. The system of claim 10, wherein the orchestration lambda is a part of an orchestration server-less layer.

12. The system of claim 11, wherein the orchestration lambda is configured to initiate one or more of the SQS queue, the job submitter lambda, or the orchestration EMR.

13. The system of claim 10, wherein the segregating the dataset into the first partition and the second partition comprises:

detecting a first identifier associated with the first partition and a second identifier associated with the second partition;

determining that the first identifier is a threshold amount different than the second identifier; and identifying the first partition and the second partition based on determining that the first identifier is the threshold amount different than the second identifier.

14. The system of claim 10, wherein the sequencing model is configured to sequence the first kick-off job message before the second kick-off job message based on one or more of a timestamp, an urgency, or an order of importance.

15. The system of claim 10, wherein the sequencing model is a machine learning model.

16. The system of claim 15, wherein the machine learning model is trained based on one or more of historical kick-off messages, simulated kick-off messages, historical sequences, or simulated sequences.

17. The system of claim 10, wherein segregating the dataset into the first partition and the second partition comprises:

providing the dataset as an input to a first machine learning model, the first machine learning model trained based on one of historical data sets or simulated datasets; and receiving a first machine learning model output comprising the first partition and the second partition based on the dataset.

18. The system of claim 17, wherein the sequencing model comprises a second machine learning model, and wherein sequencing the first kick-off job message before the second kick-off job message comprises:

providing the first machine learning model output to the second machine learning model, the second machine learning model trained based on one or more of historical kick-off messages, simulated kick-off messages, historical sequences, or simulated sequences; and receiving a second machine learning model output comprising the first kick-off job message sequenced before the second kick-off job message.

19. A system comprising:

a data storage device storing processor-readable instructions; and a processor operatively connected to the data storage device and configured to execute the processor-readable instructions to perform operations that include:

receiving a dataset comprising a plurality of partitions;

scanning the dataset to identify a first partition and a second partition, the scanning including:

detecting a first identifier associated with the first partition and a second identifier associated with the second partition;

determining that the first identifier is a threshold amount different than the second identifier; and identifying the first partition and the second partition based on determining that the first identifier is the threshold amount different than the second identifier;

generating a first kick-off job message associated with the first partition and a second kick-off job message associated with the second partition;

sequencing the first kick-off job message before the second kick-off job message based on a sequencing model;

generating a first job based on the first kick-off job message and a second job based on the second kick-off job message; and transmitting the first job before the second job based on sequencing the first kick-off job message before the second kick-off job message.

20. The system of claim 19, wherein the dataset is provided to an orchestration Elastic Map Reduce (EMR) to perform the scanning.

* * * * *